(12) United States Patent
Koyanagi

(10) Patent No.: US 8,750,430 B2
(45) Date of Patent: Jun. 10, 2014

(54) DATA RECEIVER CIRCUIT

(75) Inventor: Yoichi Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 13/079,967

(22) Filed: Apr. 5, 2011

(65) Prior Publication Data

US 2011/0249775 A1    Oct. 13, 2011

(30) Foreign Application Priority Data

Apr. 12, 2010   (JP) .................. 2010-091029

(51) Int. Cl.
*H04L 27/06* (2006.01)

(52) U.S. Cl.
USPC ........... 375/340; 375/225; 375/377; 375/349; 327/144; 327/147; 327/151; 327/162; 327/163; 341/100; 341/146; 341/162; 341/61

(58) Field of Classification Search
USPC .......... 375/225, 340, 377, 349; 327/144, 147, 327/151, 162, 163; 341/100, 146, 162, 61
See application file for complete search history.

(56) References Cited

U.S. PATENT DOCUMENTS

| | | | | |
|---|---|---|---|---|
| 5,751,724 A | * | 5/1998 | Elliott | 370/536 |
| 6,710,726 B2 | * | 3/2004 | Kim et al. | 341/100 |
| 7,116,744 B2 | | 10/2006 | Saze et al. | |
| 7,372,380 B2 | * | 5/2008 | Yoshikawa | 341/100 |
| 7,616,657 B2 | | 11/2009 | Shumarayev et al. | |
| 7,659,838 B2 | | 2/2010 | Nguyen et al. | |
| 2010/0082875 A1 | | 4/2010 | Sato | |

FOREIGN PATENT DOCUMENTS

| | | |
|---|---|---|
| JP | 05-83328 | 4/1993 |
| JP | 11-163951 | 6/1999 |
| JP | 2002-314516 | 10/2002 |
| JP | 2007-43718 | 2/2007 |
| JP | 2007-282183 | 10/2007 |
| JP | 2010-79702 | 4/2010 |
| JP | 2011-71666 | 4/2011 |

OTHER PUBLICATIONS

Japanese Office Action mailed Feb. 18, 2014 for corresponding Japanese Application No. 2010-091029, with partial English-language translation.

* cited by examiner

*Primary Examiner* — Daniel Washburn
*Assistant Examiner* — Rahel Guarino
(74) *Attorney, Agent, or Firm* — Fujitsu Patent Center

(57) ABSTRACT

A data receiver circuit for converting received serial data into parallel data in accordance with a data rate signal and for outputting the converted parallel data, the data receiver circuit includes a clock generator for generating a reference clock based on an input clock, a data latch for latching the received serial data and outputting first latched serial data in accordance with the reference clock, a first data output section for converting the first latched serial data into first parallel data with a first reference clock, in case that the data rate signal indicates a first data rate same as a data rate of the reference clock, and a second data output section for converting the first latched serial data into second parallel data with a second reference clock, in case that the data rate signal indicates a second data rate slower than the data rate of the reference clock.

3 Claims, 11 Drawing Sheets

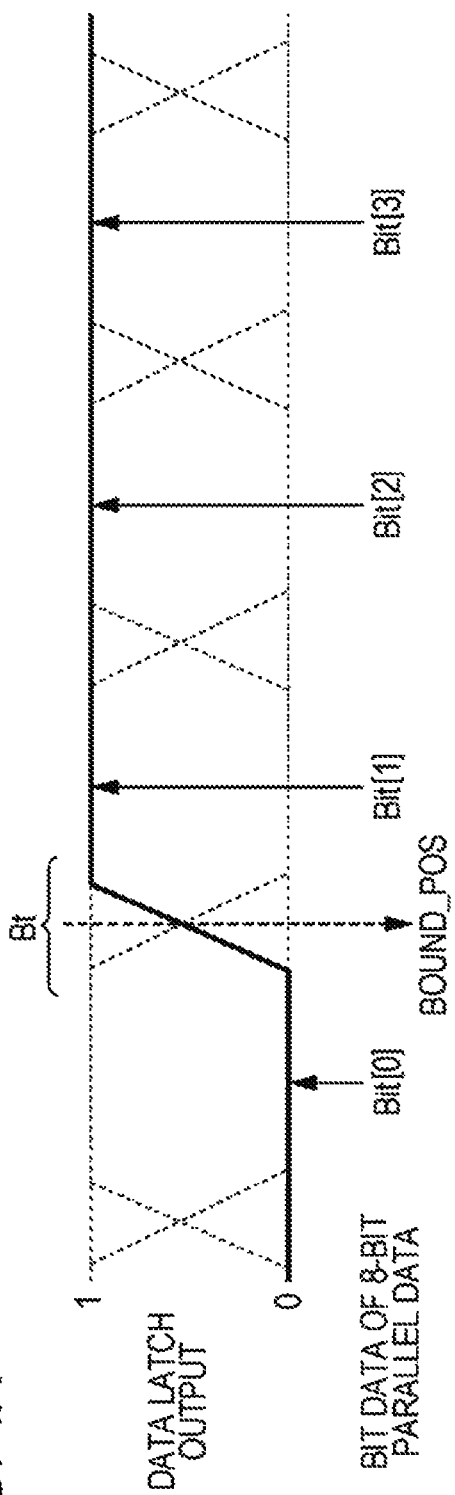

FIG. 5

| COUNTER VALUE OF CURRENT CYCLE | CHANGE POINT POSITION INFORMATION | COUNTER VALUE OF SUBSEQUENT CYCLE | SELECTOR SELECTION BIT CRITERIA | CLOCK OUTPUT |
|---|---|---|---|---|
| 0 TO 3 | 3 OR 4 | CURRENT COUNTER VALUE +2 | Bit[4] | OUTPUT |
|  | 5 OR 6 | CURRENT COUNTER VALUE +0 |  |  |
|  | OTHERS | CURRENT COUNTER VALUE +1 |  |  |
| 4 TO 7 | 4 OR 5 | CURRENT COUNTER VALUE +2 | Bit[5] | OUTPUT |
|  | 6 OR 7 | CURRENT COUNTER VALUE +0 |  |  |
|  | OTHERS | CURRENT COUNTER VALUE +1 |  |  |
| 8 TO 11 | 5 OR 6 | CURRENT COUNTER VALUE +2 | Bit[6] | OUTPUT |
|  | 7 | CURRENT COUNTER VALUE +0 |  |  |
|  | OTHERS | CURRENT COUNTER VALUE +1 |  |  |
| 12 TO 15 | 6 OR 7 | CURRENT COUNTER VALUE +2 | Bit[7] | OUTPUT |
|  | 1 | CURRENT COUNTER VALUE +0 |  |  |
|  | OTHERS | CURRENT COUNTER VALUE +1 |  |  |
| 16 | ARBITRARY | CURRENT COUNTER VALUE +1 | ARBITRARY | NO OUTPUT |
| 17 TO 20 | 7 | CURRENT COUNTER VALUE +2 | Bit[0] | OUTPUT |
|  | 1 OR 2 | CURRENT COUNTER VALUE +0 |  |  |
|  | OTHERS | CURRENT COUNTER VALUE +1 |  |  |
| 21 TO 24 | 1 | CURRENT COUNTER VALUE +2 | Bit[1] | OUTPUT |
|  | 2 OR 3 | CURRENT COUNTER VALUE +0 |  |  |
|  | OTHERS | CURRENT COUNTER VALUE +1 |  |  |
| 25 TO 28 | 1 OR 2 | CURRENT COUNTER VALUE +2 | Bit[2] | OUTPUT |
|  | 3 OR 4 | CURRENT COUNTER VALUE +0 |  |  |
|  | OTHERS | CURRENT COUNTER VALUE +1 |  |  |
| 29 TO 32 | 2 OR 3 | CURRENT COUNTER VALUE +2 | Bit[3] | OUTPUT |
|  | 4 OR 5 | CURRENT COUNTER VALUE +0 |  |  |
|  | OTHERS | CURRENT COUNTER VALUE +1 |  |  |

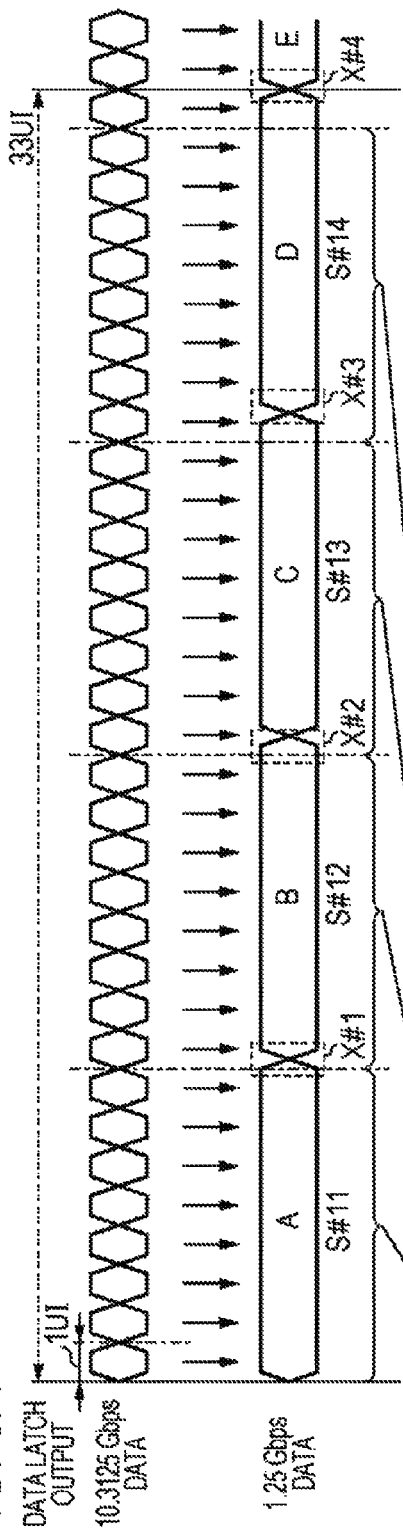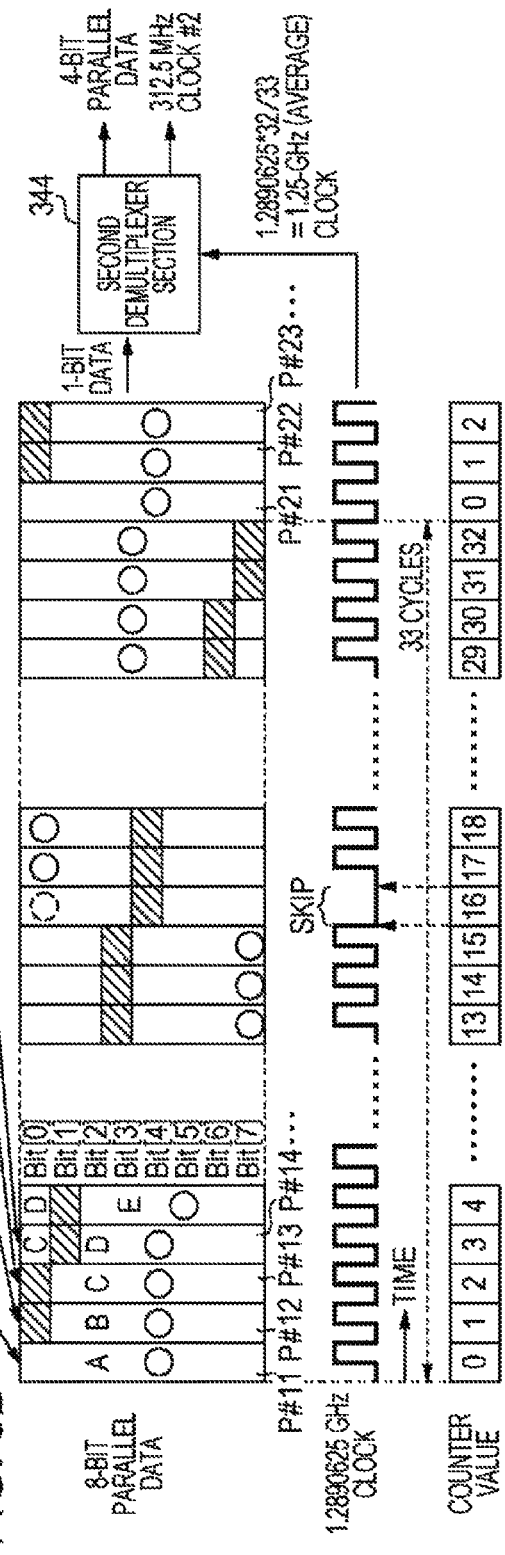
FIG. 6A
FIG. 6B

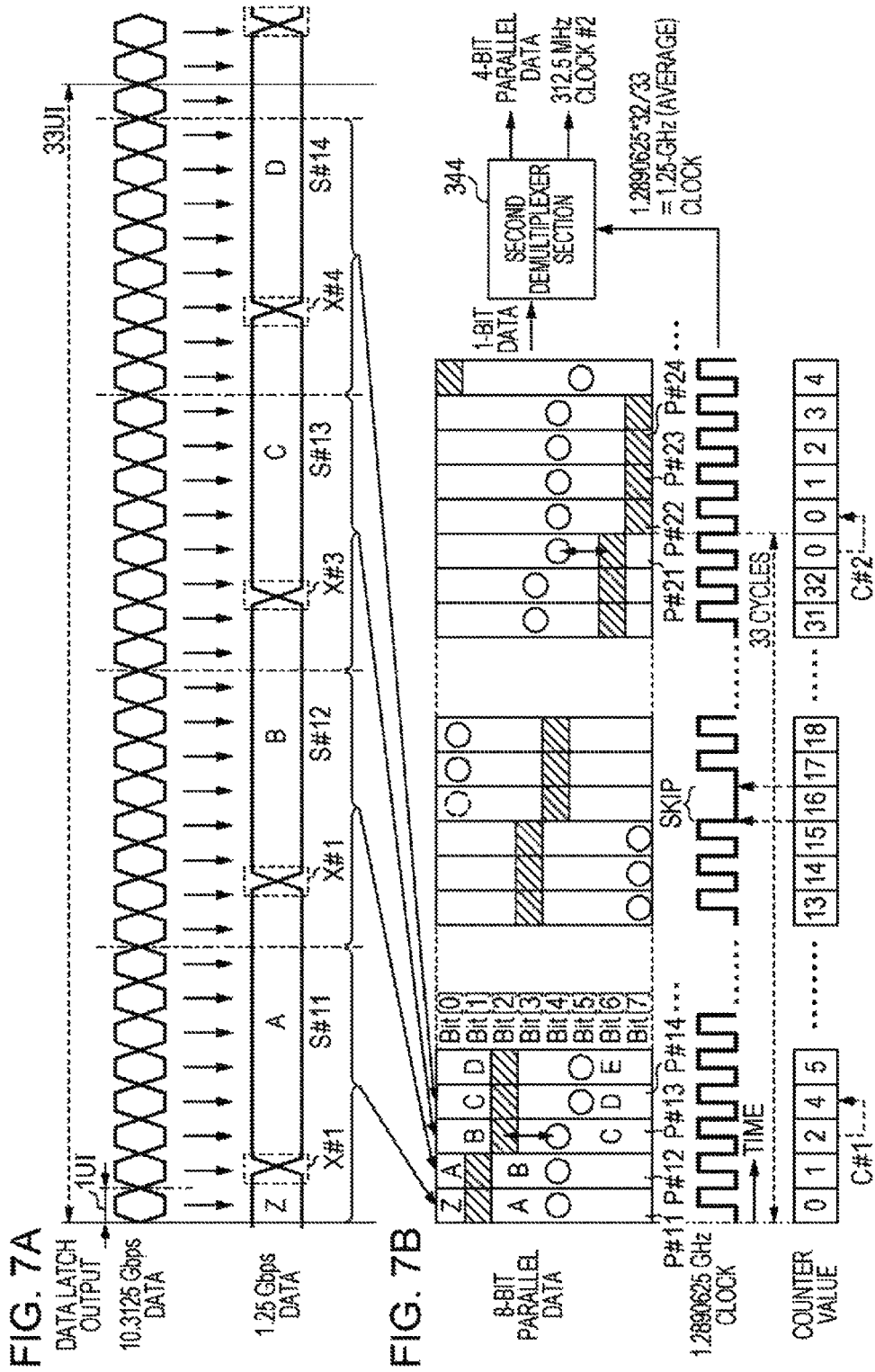

DATA RECEIVER CIRCUIT

CROSS-REFERENCE TO RELATED APPLICATION

This application is based upon and claims the benefit of priority from the prior Japanese Patent Application No. 2010-91029 filed on Apr. 12, 2010, the entire contents of which are incorporated herein by reference.

FIELD

The embodiments discussed herein are related to a data receiver circuit which includes a plurality of data transmission ports.

BACKGROUND

Recently, large-scale integrated circuits (LSIs) including a plurality of data transmission ports which support high speed data transmission standards have been used in, for example, server devices and network devices. Exemplary high speed data transmission standards are 10 Gigabit Ethernet (the IEEE 802.3ae standard; Ethernet is a registered trademark) and Peripheral Component Interconnect (PCI)-Express.

For the high speed data transmission, high speed and high performance, and at the same time, low cost and low power consumption LSIs are in increasing demand. In order to achieve such LSIs, data transmitter and receiver circuits becomes more populated and thereby a single LSI has a plurality of data transmission ports (i.e., channels).

A data receiver circuit typically includes a receiver circuit and a phase-locked loop (PLL) circuit which generates clocks. The PLL circuit occupies a large part of a circuit area of the LSI and is high in power consumption as compared with other circuits. Therefore, if a PLL circuit is provided in each channel in a structure in which a plurality of data transmission ports are mounted on a single LSI, the PLL circuits occupy an even larger part of the entire area of the LSI and increase the power consumption. It is therefore common in a data receiver circuit to share a single PLL circuit by receiver circuits of a plurality of channels.

In the field of deserializer networks for high speed serial data receivers mounted on programmable logic device integrated circuits, networks for converting serial data into parallel data having arbitrary data widths have been proposed.

In a hetero transceiver architecture to provide extensive programmability of a programmable logic device, a high speed serial data transceiver network has been proposed which includes some channels that may operate at a data rate to a first, relatively low maximum data rate and other channels that may operate at a data rate to a second, relatively high maximum data rate.

The followings are reference documents.
  Document 1: Japanese Laid-Open Patent Publication No. 2007-43718
  Document 2: Japanese Laid-Open Patent Publication No. 2007-282183

Hereinafter, an exemplary related art data transmitter and receiver circuit will be described.

A data receiver circuit 900 illustrated in FIG. 10 includes a PLL circuit 901 and a plurality of receiver circuits 902.

In the data receiver circuit 900, a plurality of inputs of serial data #11 to #14 are converted into parallel data #11 to #14 in each of the receiver circuits 902, and the converted parallel data #11 to #14 is transmitted.

In the following description, the channel #11 supports conversion of an input of the serial data #11 into the parallel data #11. Other channels #12 to #14 are similar to the channel #1.

The PLL circuit 901 transmits predetermined clock signals to each of the receiver circuits 902. The PLL circuit 901 transmits clock signals Clk to each of the receiver circuits 902. Upon reception of the serial data #11 to #14, each of the receiver circuits 902 converts the serial data #11 to #14 to the parallel data #11 to #14 in accordance with the clock signals Clk and transmits the obtained parallel data #11 to #14.

The data receiver circuit 910 illustrated in FIG. 11 includes a plurality of PLL circuits 911, a plurality of receiver circuits 912 and a plurality of switch circuits (SW) 913. A plurality of PLL circuits 911 are represented as, for example, a PLL circuit 911A which outputs high speed clocks ClkH and a PLL circuit 911B which outputs low speed clocks ClkL.

The PLL circuit 911A generates the high speed clocks ClkH and transmits the generated high speed clocks ClkH to the switch circuits 913. The PLL circuit 911B generates the low speed clocks ClkL and transmits the generated low speed clocks ClkL to the switch circuits 913. Here, the high speed clocks ClkH are high frequency clocks as compared with the low speed clocks ClkL like the data receiver circuit 900 illustrated in FIG. 10.

The switch circuits 913 are switches for selecting clocks to be supplied to the receiver circuits 912 from among a plurality of clock inputs. The switch circuits 913 receive the high speed clocks ClkH generated by the PLL circuit 911A and the low speed clocks ClkL generated by the PLL circuit 911B. Each of the switch circuits 913 selects the high speed clocks ClkH or the low speed clocks ClkL in accordance with received clock selection signals Clk #21 to #24 and transmits the selected clocks to the corresponding receiver circuit 912.

The receiver circuits 912 receive serial data #21 to #24. Each of the receiver circuits 912 converts the serial data #21 to #24 into parallel data #21 to #24 in accordance with the clocks transmitted from the switch circuits 913.

Since the data receiver circuit 910 includes a plurality of PLL circuits 911 each of which supplies clocks which support the different data rates, each channel may select a data rate independently in accordance with the clock selection signals Clk #21 to #24. This allows the data receiver circuit 910 to convert the received serial data #21 to #24 into the parallel data #21 to #24 at the data rate set for each channel.

It is desired in many systems that the data rate may be selected independently for each connection destination of the channel. Data may be received at different data rates for each transmission port in a data transmission circuit provided with a plurality of data transmission ports (i.e., channels).

The data receiver circuit 900 illustrated in FIG. 10 includes a plurality of channels #11 to #14 in accordance with a plurality of receiver circuits 902. Since a single PLL circuit 901 is shared by a plurality of channels #11 to #14 in the data receiver circuit 900, the data rates of all the parallel data #11 to #14 of the channels are the same. That is, since independent selection of the high speed clock ClkH or the low speed clock may not be made in each channel in the data receiver circuit 900, all the channels may employ a single data rate in accordance with a single clock. Such a less flexible configuration allows no independent selection of the data rate for each connection destination of the channel.

Since each channel independently corresponds to a data rate at which data is transmitted in the data receiver circuit 910 illustrated in FIG. 11, a plurality of PLL circuits 911 for generating clocks supporting different data rates are required. In addition, since each channel independently selects an output from a plurality of PLL circuits 911 and supplies the output to a receiver circuit 912, a plurality of switch circuits 913 corresponding to each of the channels are required for switching clocks output from a plurality of PLL circuits 911.

Thus, the PLL circuits 911 and the switch circuits 913 occupy an increased circuit area in the data receiver circuit 910. In addition, the data receiver circuit 910 requires a plurality of PLL circuits 911 and a switch circuit 913 which switches clocks output from the PLL at a high speed so as to correspond to operation speed. Power consumption thus increases. Use of switch circuit 913 for switching the output clocks increases jitter, which decreases timing accuracy for sampling serial data and increases occurrence of data receiving error.

As described above, in a circuit configuration in which a data receiver circuit includes a single PLL circuit which supplies a single clock, data rates of a plurality of channels may not be independently set.

In a circuit configuration in which a data receiver circuit includes a plurality of PLL circuit, on the other hand, which supplies a plurality of clocks, there are also problems that the PLL circuits and the switch circuits occupy a large part of the area of the LSI and increase in power consumption.

SUMMARY

According to an aspect of the embodiment, a data receiver circuit for converting received serial data into parallel data in accordance with a data rate signal and for outputting the converted parallel data, the data receiver circuit includes a clock generator for generating a reference clock based on an input clock, a data latch for latching the received serial data and outputting first latched serial data in accordance with the reference clock, a first data output section for converting the first latched serial data into first parallel data with a first reference clock, in case that the data rate signal indicates a first data rate same as a data rate of the reference clock, and a second data output section for converting the first latched serial data into second parallel data with a second reference clock, in case that the data rate signal indicates a second data rate slower than the data rate of the reference clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate an operation for detecting a change position of low speed data according to one embodiment;

FIG. 5 illustrates an exemplary counter information table according to one embodiment;

FIGS. 6A and 6B illustrate an operation of a boundary detection/low speed data extraction section according to one embodiment;

FIGS. 7A and 7B illustrate an operation of a boundary detection/low speed data extraction section according to one embodiment;

DESCRIPTION OF EMBODIMENTS

Figure 1:
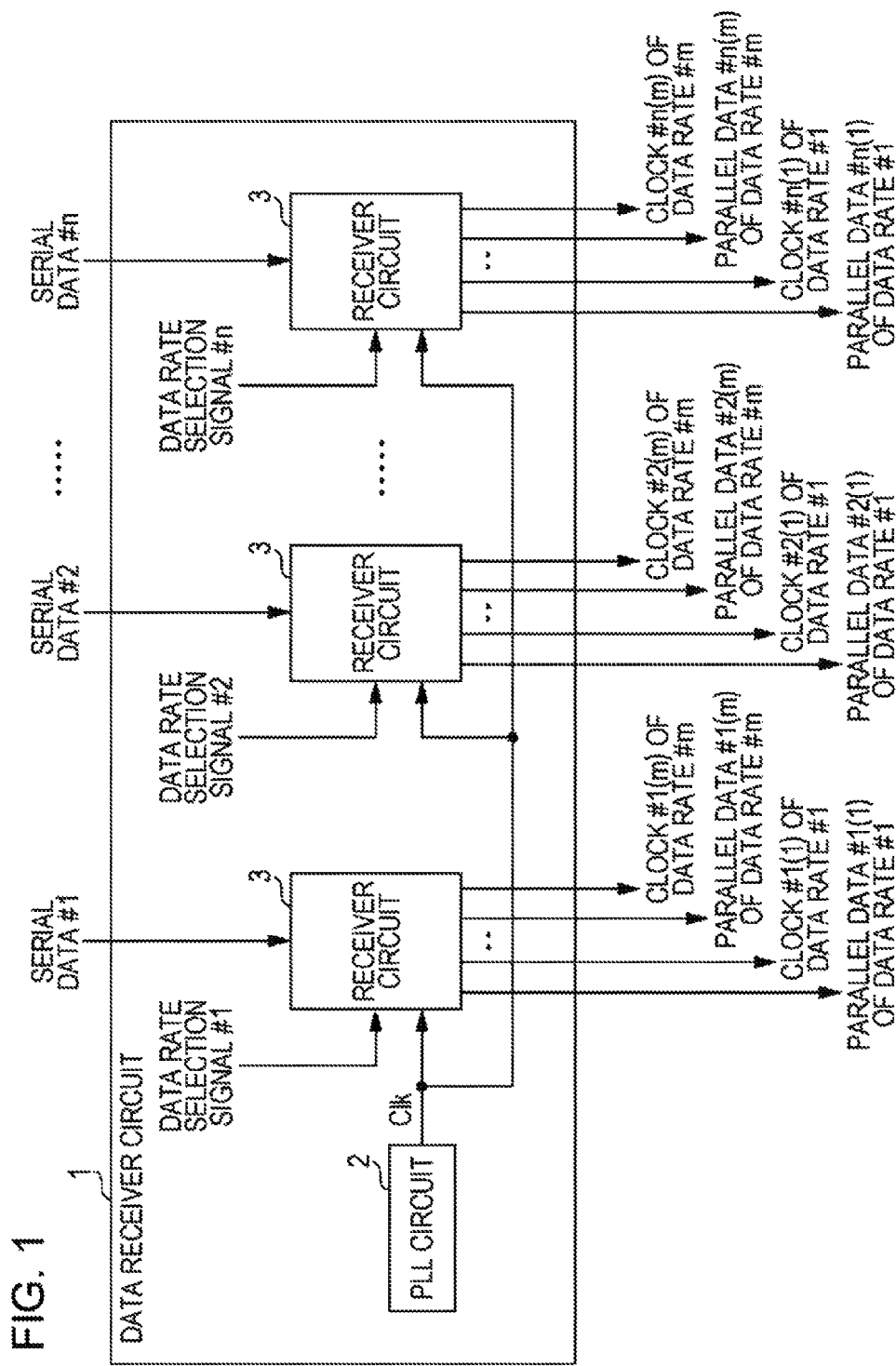
FIG. 1 illustrates an exemplary configuration of a data receiver circuit disclosed as one embodiment of the present invention.

FIG. 1 illustrates an exemplary configuration of a data receiver circuit 1 disclosed as one embodiment of the present invention.

The data receiver circuit 1 illustrated in FIG. 1 includes a plurality of channels #1 to #n (n is an integer greater than or equal to 2) and receives serial data (i.e., input signals) at different data rates for each of the channels #1 to #m (m is an integer greater than or equal to 2). The data receiver circuit 1 then performs a parallel conversion of the received serial data in accordance with data rate selection signals #1 to #n and outputs generated parallel data #1 to #n and clocks #1 to #n.

The parallel data #1 illustrated in FIG. 1 is representative of, for example, parallel data #1(1) which supports a data rate #1 and the parallel data #1(m) which supports a data rate #m (m is an integer greater than or equal to 2). Other parallel data, e.g., #n, is also similarly represented.

The clock #1 is representative of, for example, a clock #1(1) which supports the data rate #1 and a clock #1(m) which supports the data rate #m. Other clocks, e.g., #n, are also similarly represented.

The parallel data consists of a plurality of bits (i.e., bit widths) of data transmitted by a plurality of signal lines, buses or other methods. The bit widths are, for example, 8 bits, 16 bits and 66 bits.

The serial data consists of a plurality of bits of data transmitted in a time shared manner via a single signal line or other methods.

In the present embodiment, the channel #1 is a channel in which the serial data #1 is converted into parallel data #1(1) to #1(m) at the data rates #1 to #m. Other channels #2 to #n are similar to the channel #1.

The data receiver circuit 1 illustrated in FIG. 1 includes a PLL circuit 2 and a plurality of receiver circuits 3 corresponding to the channels #1 to #n.

The PLL circuit 2 supplies clock signals ("clocks Clk") corresponding to the reference input clocks to each of the receiver circuits 3.

The clocks Clk are clock signals which support the maximum high speed data rate (hereinafter referred to as a "high speed data rate") of the parallel data transmitted by the data receiver circuit 1.

In the data receiver circuit 1 illustrated in FIG. 1, the data rate #1 is the high speed data rate and other data rates #2 to #m are data rates of lower speed than the data rate #1 (hereinafter referred to as a "low speed data rate").

Note that the high speed data rate corresponds to the "first data rate" and low speed data rate corresponds to the "second data rate" recited in claims of the present application.

The receiver circuit 3 receives data rate selection signals #i (i is an integer of 1 to n) which instruct a data rate for each channel. When a data rate #j (j is an integer of 1 to m) of either the high speed data rate or the low speed data rate is determined in accordance with the data rate selection signal #i, the receiver circuit 3 performs a serial/parallel conversion of the serial data #i in accordance with the determined data rate #j, and generates and outputs parallel data #i and a clock #i.

In particular, the receiver circuit 3 determines parallel data #i corresponding to received serial data #i at the instructed data rate #j in accordance with the data rate selection signal #i.

If the data rate selection signal #i is a high speed data rate, the receiver circuit 3 performs a serial/parallel conversion of the serial data #i into the parallel data which supports the data rate #1 in accordance with the clock Clk of the PLL circuit 2 and generates the parallel data #i(1) and the clock #i(1).

If the data rate selection signal #i is a low speed data rate, the receiver circuit 3 first converts the serial data #i into parallel data ("intermediate parallel data") at the data rate #1 which is a high speed data rate in accordance with the clock Clk at a high speed data rate. The receiver circuit 3 then generates parallel data #i(2) to #i(m) which supports the low speed data rate and low speed clocks (namely, clocks #i(2) to #i(m)) on the basis of detected edges of the converted intermediate parallel data and intermediate clocks obtained through frequency division of the clock Clk.

The receiver circuit 3 generates the parallel data #i which supports the determined data rate #j and the clock #i, and then outputs (i.e., transmits to other circuits) the generated parallel data #i and the clock #i.

The parallel data #i(1) which supports the high speed data rate corresponds to the "first parallel data," the clock #i(1) corresponds to the "first output clock," the parallel data #i(2) to #i(m) which support the low speed data rate corresponds to the "second parallel data" and the low speed clocks (clocks #i(2) to #i(m)) correspond to the "second output clock" recited in claims of the present application.

Among the serial data d (d corresponds to each of #1 to #n illustrated in FIG. 1) input to the receiver circuit 3, the serial data of the data rate #1 is the serial data supporting the high speed data rate. The high speed data rate (namely, the data rate #1) is, for example, 10.3125 Gbps (Gigabit/sec).

The serial data supporting the data rate #2 is the serial data of the low speed data rate. The low speed data rate (namely, the data rate #2) is, for example, 1.25 Gbps.

Here, serial data is input to each of the receiver circuits 3 at either data rate #1 or #2. For example, serial data at the data rate #1 or serial data at the data rate #2 may be input to all the receiver circuits 3 illustrated in FIG. 1. Alternatively, serial data at different data rates may be input to some receiver circuits 3.

The receiver circuit 3 may receive a data rate selection signal #i at different data rate #j for each channel or may receive a data rate selection signal #i at the same data rate #j for each channel.

The PLL circuit 2 outputs the clock Clk which is a reference input clock of the serial data d to the receiver circuit 3. The reference input clock is a 10.3125-GHz clock.

If a data rate selection signal s supports a high speed data rate (hereinafter, referred to as a high speed mode), the receiver circuit 3 outputs 33-bit parallel data and a 312.5 MHz clock #1 upon input of the serial data d at the data rate of 10.3125 Gbs.

If, on the other hand, the data rate selection signal s supports a low speed data rate (hereinafter, referred to as a low speed mode), the receiver circuit 3 outputs 4-bit parallel data and a 312.5 MHz clock #2 upon input of the serial data d at the data rate of 1.25 Gbs.

In this manner, the receiver circuit 3 outputs the above-described parallel data selectively in accordance with the data rate selection signal s.

Figure 2:
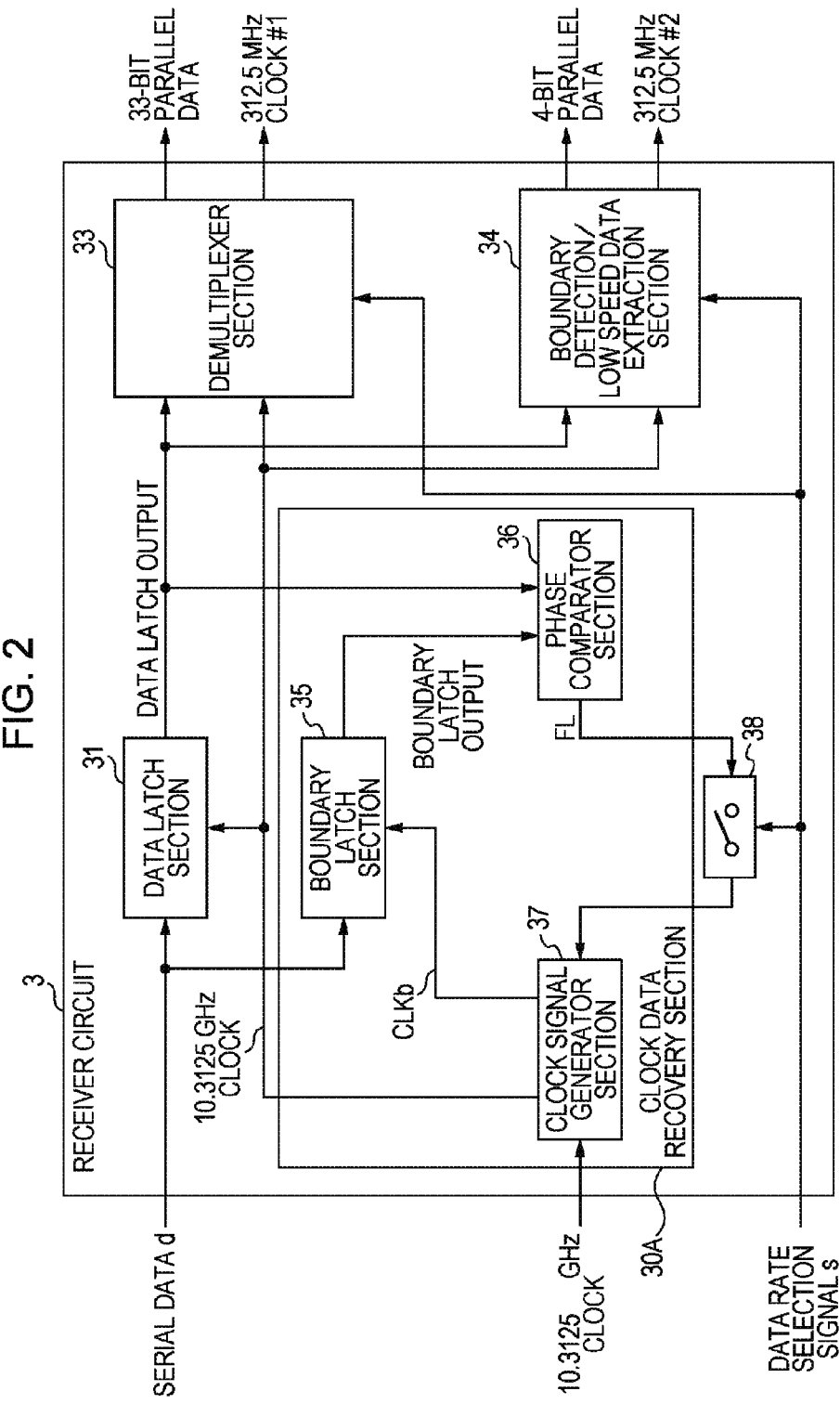
FIG. 2 illustrates an exemplary configuration of a receiver circuit according to one embodiment.

FIG. 2 illustrates an exemplary configuration of the receiver circuit 3 according to the present embodiment.

The receiver circuit 3 includes a data latch section 31, a demultiplexer section 33, a boundary detection/low speed data extraction section 34, a boundary latch section 35, a phase comparator section 36, a clock signal generator section 37 and a switch section 38.

The data latch section 31 receives the serial data d input to the receiver circuit 3, and latches data of the received serial data d in accordance with the 10.3125-GHz clocks output from the clock signal generator section 37. The data latch section 31 outputs latched data Dt (which will be described later with reference to FIG. 3) to, for example, the demultiplexer section 33 and the boundary detection/low speed data extraction section 34 as a data latch output.

The demultiplexer section 33 performs a serial/parallel conversion in the high speed mode in accordance with the data rate selection signal s. The demultiplexer section 33 generates parallel data corresponding to the high speed data rate signal from the data latch output in accordance with the 10.3125-GHz clocks output from the clock signal generator section 37. In particular, the demultiplexer section 33 generates and outputs 33-bit parallel data ("first parallel data") and a 312.5 MHz clock #1 ("first output clock").

The boundary detection/low speed data extraction section 34 performs a serial/parallel conversion in the low speed mode in accordance with the data rate selection signal s. The boundary detection/low speed data extraction section 34 generates parallel data corresponding to the low speed data rate signal from the data latch output in accordance with the 10.3125-GHz clocks output from the clock signal generator section 37. In particular, the boundary detection/low speed data extraction section 34 generates and outputs 4-bit parallel data ("second parallel data") and a 312.5 MHz clock #2 ("second output clock") in accordance with the data latch output and the 10.3125-GHz clock.

The boundary latch section 35 latches data of the serial data d in accordance with the 10.3125-GHz clocks output from the clock signal generator section 37 and outputs the latched data to the phase comparator section 36 as a boundary latch output.

The phase comparator section 36 compares the data latch output of the data latch section 31 and the boundary latch output of the boundary latch section 35 and supplies (i.e., feedbacks) the comparison result ("feedback output FL") to the clock signal generator section 37 on a feedback line.

The clock signal generator section 37 generates the 10.3125-GHz clock which supports the high speed mode in accordance with the 10.3125-GHz clock that is input to the receiver circuit 3 and the feedback output FL output from the phase comparator section 36.

The boundary latch section 35, the phase comparator section 36 and the clock signal generator section 37 correspond to the clock data recovery section ("CDR section") 30 which makes known clock data recovery.

The switch section 38 is a switch disposed between signal lines which connect the feedback output FL from the phase comparator section 36 and the input to the clock signal generator section 37.

The switch section 38 closes the switch in the high speed mode and opens the switch in the low speed mode in accordance with the data rate selection signal s.

In this manner, the phase comparator section 36 and the clock signal generator section 37 are connected to each other in the high speed mode such that the clock recovery function is performed. The clock signal generator section 37 outputs a clock (10.3125-GHz clock) which has been recovered.

Accordingly, in the data latch section 31, the data of the serial data d (10.3125-Gbps serial data) is latched in accordance with the output clock.

During the low speed mode, on the other hand, the FL output of a feedback loop of the phase comparator section 36 is turned off and clock recovery function is suspended. The clock signal generator section 37 outputs the clock (10.3125-GHz clock) which has not been recovered. Accordingly, in the data latch section 31, the data of the serial data d (1.25-Gbps serial data) is latched in accordance with the output clock. That is, in the low speed mode, the data is latched in accordance with the clocks with the same timing as that of the 10.3125-GHz clocks input to the receiver circuit 3.

In the receiver circuit 3 illustrated in FIG. 2, the high speed clock Clk output from the PLL circuit 2 is used as the reference input clock (the 10.3125-GHz clock) and an internal clock (10.3125-GHz clock) with a same frequency as that of the reference input clock is generated. The frequency ratio is not limited to that of the present embodiment. For example, the high speed clock Clk may be a 10.3125/2-GHz clock, and a first internal clock (10.3125-GHz clock) with a doubled frequency as that of the high speed clock Clk may be generated.

[Process in Low Speed Mode]

Hereinafter, an operation of the receiver circuit 3 in the low speed mode will be described.

The low speed data rate and the high speed data rate which are input to the receiver circuit 3 may sometimes not be in a simple integer ratio. The boundary detection/low speed data extraction section 34 includes processing sections described below in order to perform a function to generate parallel data of proper low speed data even if the low speed data rate and the high speed data rate are not in a simple integer ratio.

Figure 3:
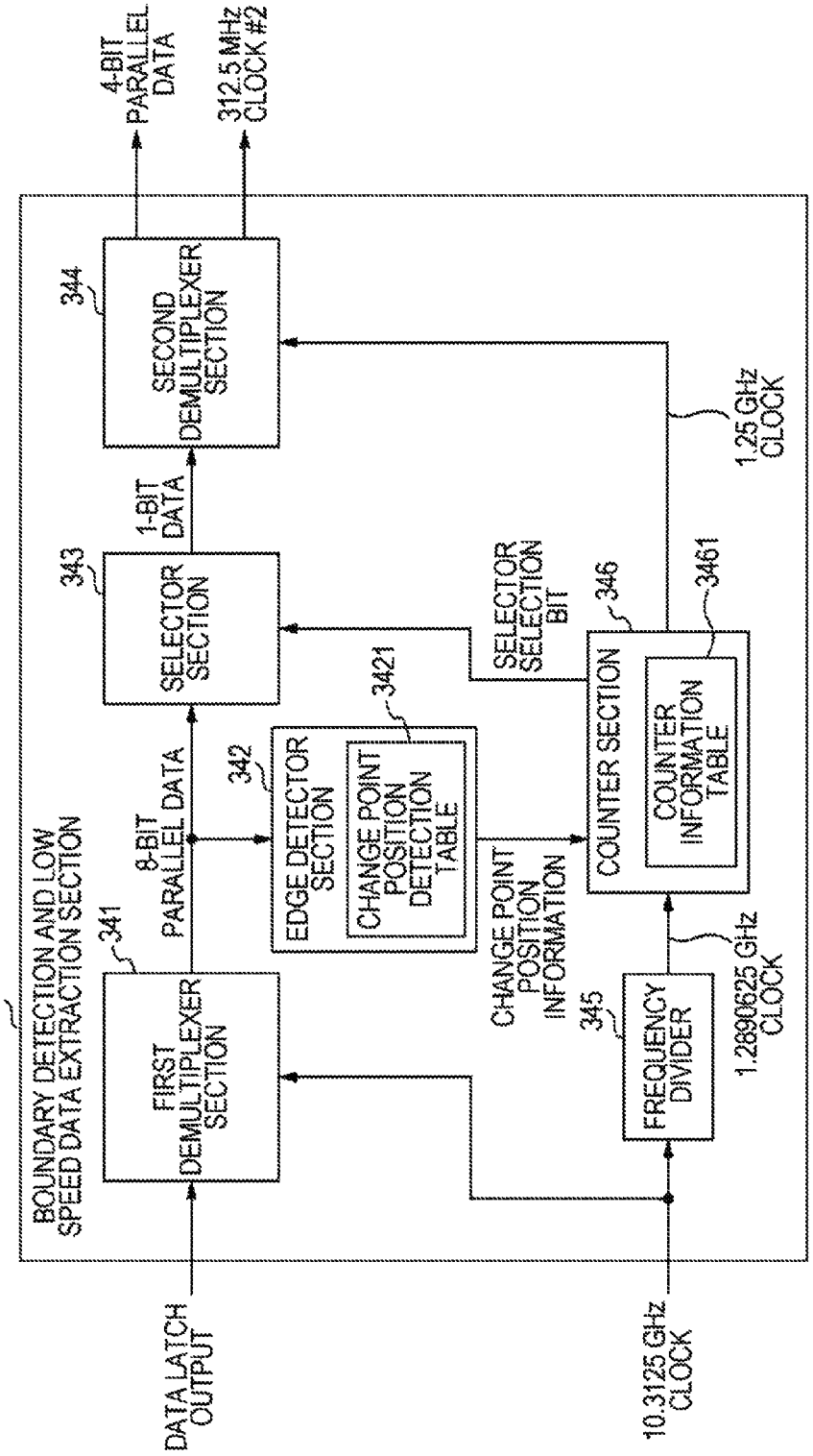
FIG. 3 illustrates an exemplary configuration of a boundary detection/low speed data extraction section according to one embodiment.

FIG. 3 illustrates an exemplary configuration of the boundary detection/low speed data extraction section 34.

The boundary detection/low speed data extraction section 34 includes a first demultiplexer section 341, an edge detector section 342, a selector section 343, a second demultiplexer section 344, a frequency divider 345 and a counter section 346.

The first demultiplexer section 341 performs a serial/parallel conversion of the data latch output output from the data latch section 31 into the parallel data in accordance with the input clock, and outputs the converted parallel data (which corresponds to the intermediate parallel data) to the edge detector section 342 and the selector section 343. The input clock of the first demultiplexer section 341 is the 10.3125-GHz clock output from the clock signal generator section 37.

The first demultiplexer section 341 performs a serial/parallel conversion of the data latch output output from the data latch section 31 into 8-bit parallel data.

The edge detector section 342 detects a change position of data for each input parallel data.

For binary (0, 1) bit data, for example, the change position of data is a bit position at which the data changes from 0 to 1 or 1 to 0 in continuous bits (or signals).

In the present embodiment, the edge detector section 342 detects, for each input 8-bit parallel data, change positions in accordance with a change point position detection table 3421 and outputs the detection result to the counter section 346 as change point position information BOUND_POS. The change point position information is used as a boundary of the low speed data (e.g., 1.25-Gbps serial data) input in the low speed mode.

The selector section 343 extracts 1-bit data from the bit data of the input intermediate parallel data (which is 8-bit parallel data) in accordance with a selector selection bit instructed (i.e., output) from the counter section 346, and outputs the extracted 1-bit data to the second demultiplexer section 344.

The second demultiplexer section 344 rearranges the 1-bit data output from the selector section 343 into parallel data for each 4 bits in accordance with a clock 1 (which is a 1.25-GHz clock) output from the counter section 346, and outputs the rearranged parallel data as 4-bit parallel data. At the same time, whenever the 4-bit rearrangement is completed, the second demultiplexer section 344 outputs the clock in synchronization with the parallel data. Since the data has been converted into 4-bit parallel data, the data is output as a 312.5-MHz clock which is ¼ of the 1.25-GHz clock.

The frequency divider 345 divides a local clock (which is a 10.3125-GHz clock) input to the boundary detection/low speed data extraction section 34 by 8 and generates an intermediate clock (here, a 1.2890625-GHz clock) which is used as a counting operation standard of the counter section 346.

The counter section 346 uses the intermediate clock output from the frequency divider 345 as an operation clock. The counter section 346 refers to a counter information table 3461 which has been stored in advance, determines 1 bit (i.e., a bit position) extracted from the intermediate parallel data as a selector selection bit in accordance with the change point position information output from the edge detector section 342, and then outputs (i.e., instructs) the determined selector selection bit to the selector section 343.

The counter section 346 further determines an counting operation in accordance with the counter information table 3461, and generates an internal clock (which is a 1.25-GHz clock) for the reference clock of the low speed mode from the input intermediate clock (which is the 1.2890625-GHz clock). The counter section 346 then outputs the generated internal clock to the second demultiplexer section 344 and the second frequency divider 347.

The counter information table 3461 is a data table which represents conditions under which determines a selector selection bit and existence of a counting operation in accordance with a count value of a cycle and change point position information.

Next, an operation of the boundary detection/low speed data extraction section 34 will be described.

In the boundary detection/low speed data extraction section 34, the first demultiplexer section 341 inputs the clock (which is the 10.3125-GHz clock) output from the clock signal generator section 37 and performs a serial/parallel conversion of the data latch output output from the data latch section 31 into 8-bit parallel data in accordance with the input clock. The first demultiplexer section 341 then outputs the converted intermediate parallel data to the edge detector section 342 and the selector section 343.

The edge detector section 342 detects a change position of data for each input 8-bit parallel data.

FIGS. 4A and 4B illustrate an operation of the edge detector section 342. FIG. 4A illustrates a change position of the low speed data and FIG. 4B illustrates an exemplary change point position detection table 3421 illustrated in FIG. 3.

The first demultiplexer section 341 converts the data latch output into 8-bit parallel data of Bit[0] to Bit[7] in accordance with the 10.3125-GHz clock.

In the example illustrated in FIG. 4A, the Bit[0] of the 8-bit parallel data is the least significant bit (bit 0), and bit data Bit[1], Bit[2], Bit[3] and so on are the more significant bits in this order, and Bit[7] is the most significant bit (bit 7).

If the bit data with the timing corresponding to Bit[0] of the data latch output is "0" and bit data with the timing corresponding to Bit[1], Bit[2], Bit[3], . . . , and Bit[7] (not illustrated) of the data latch output are "1," the change position Bt between the two bits of Bit[0] and Bit[1] of the 8-bit parallel data becomes the position detected during the boundary detection.

Upon input of the 8-bit parallel data (Bit[0] to Bit[7]) output from the first demultiplexer section 341, the edge detector section 342 detects whether continuous 2 bits change from 0 to 1 or change from 1 to 0 for each 8-bit parallel data. The edge detector section 342 refers to the previously stored change point position detection table 3421, determines change point position information BOUND_POS in accordance with the detected change position, and outputs the determined change point position information BOUND_POS to the counter section 346.

The change point position detection table 3421 illustrated in FIG. 4B is a data table in which the change point position information BOUND_POS is set for each predetermined combination of the bit data of the 8-bit parallel data.

In the change point position detection table 3421, as the combination of the bit data, the change point position information BOUND_POS for the discrimination of the 2-bit change position Bt is set for each continuous 2-bit change position in the 8-bit parallel data.

For example, if the bit data of the "8-bit parallel data" is Bit[0]=0, Bit[1]=1 and Bit[2] to Bit[7]=1, the change position Bt is located between Bit[0] and Bit[1], and the change point position information BOUND_POS="1" corresponding to this change position Bt is determined in accordance with the change point position detection table 3421 illustrated in FIG. 4B.

Conversely, if the bit data of the "8-bit parallel data" is Bit[0]=1, Bit[1]=0 and Bit[2] to Bit[7]=0, the change position Bt of the "8-bit parallel data" is located between Bit[0] and Bit[1], and, the change point position information BOUND_POS="1" is determined similarly.

The frequency divider 345 divides the frequency of the input clock (which is the 10.3125-GHz clock) by 8 and outputs an intermediate clock (which is a 1.2890625-GHz clock) to the counter section 346 as counting standard of the counter section 346.

In the present embodiment, since the first demultiplexer section 341 converts the data latch output into 8-bit parallel data, the frequency of the input clock is divided by 8 to generate the intermediate clock. However, this division ratio is not limited to the parallel data width as long as the edge detector section 342, the selector section 343 and the counter section 346 are corrected appropriately.

The counter section 346 inputs the change point position information BOUND_POS output from the edge detector section 342 and the intermediate clock (which is the 1.2890625-GHz clock) output from the frequency divider 345.

And counter section 346 performs a counting operation in accordance with a clock period unit (i.e., cycle) of the input clock with reference to the counter information table 3461, and generates the internal clock (which is the 1.25-GHz clock) for the reference clock of the low speed mode with reference to the counter information table 3461. The counter section 346 then outputs the generated 1.25-GHz clock to the second demultiplexer section 344.

The counter section 346 also determines 1 bit (i.e., a bit position) to be extracted from the 8-bit parallel data together with the counting operation as a selector selection bit with reference to the counter information table 3461. The counter section 346 then outputs (i.e., instructs) the determined selector selection bit to the selector section 343. Bit 0 (which is the least significant bit) and bit 2 are determined as exemplary selector selection bits.

FIG. 5 illustrates an exemplary counter information table 3461. As illustrated in FIG. 5, in the counter information table 3461, setup information is previously stored for "count value of current cycle," "change point position information," "count value of subsequent cycle," "selector selection bit criteria" and "(existence of) clock output."

"Count value of current cycle" is divided into sections of values representing a counter ("current count values") given by the counter section 346 immediately previously in the current cycle of the input clock. "Change point position information" is divided into sections of values of the change point position information BOUND_POS.

"Count value of subsequent cycle" is a setting value representing the number of count values to be updated from the current count value during the subsequent cycle of the input clock. Examples of the stored setting value include "current count value+0" (keeping the current count value), "current count value+1" (an increment of the current count value by one) and "current count value+2" (an increment of the current count value by two) in accordance with the sections of the change point position information BOUND_POS.

"Selector selection bit criteria" represents the bit position of the 1-bit data extracted from the 8-bit parallel data in the cycle of the input clock. The bit position is a setting value for the extraction of the bit data at a bit position near the center of the intermediate parallel data (which is the 8-bit parallel data).

"Clock output" is a setting value representing existence of an output of the input clock. "Output" or "no output" is set as the setting value. "Output" represents an operation to output (i.e., pass through) the input clock by the counter section 346 and "no output" represents an operation not to output (i.e., skip) the input clock by the counter section 346.

In the counter information table 3461, a combination of a section of "count value of current cycle" and a section of "change point position information" determines a setting value of corresponding "count value of subsequent cycle," "selector selection bit criteria" and "clock output."

Sections of "count value of current cycle" in the counter information table 3461 are prepared in advance in accordance with a repetition range of the count value ("count value range") in the counting operation performed by the counter section 346. For example, if the count value range of the counter section 346 is in a range of integer values of 0 to 32, sections are arbitrarily prepared with the count values in the range of 0 to 32 as illustrated in FIG. 5.

The count value range of the counter section 346 is set in accordance with a proportion between the data transfer rate in the high speed mode and the data transfer rate in the low speed mode. In particular, the count value range of the counter section 346 is set in unit intervals (UIs) which represents a 1-bit time width of the data in the reference clock of the receiver circuit 3 (i.e., the reference clock in the high speed mode) in correspondence with a period ratio of data in the high speed mode and in the low speed mode.

In the present embodiment, the data period in the high speed mode is 10.3125 Gbps and the data period in the high speed mode and in the low speed mode is in a relationship of 8.25 UIs of 10.3125-Gbps data equals to 1 UI of 1.25-Gbps data. If the data rate ratio of the high speed mode and the low speed mode is not in an integer multiple ratio as in this case, the clock in the low speed mode (1.25-GHz clock) may not be obtained by merely dividing the clock in the high speed mode (10.3125-GHz clock). Thus, the count value range (0 to 32) in the counter information table 3461 is set in accordance with the data period ratio of the high speed mode and the low speed mode (here, 33 UIs: 32 UIs).

The counter section 346 performs a counting operation to provide the count value for each cycle of the input clock within the range of the count value so as to output or not to output the input clock in each cycle.

The clocks are thus adjusted and internal clocks corresponding to the reference clock of the low speed mode are output. In particular, the counter section 346 performs or skips the clock output in accordance with the setting of the "clock output" (i.e., "output" or "no output") in the counter information table 3461, and generates and the outputs clock in which the input clock (1.2890625-GHz clock)×32/33=1.25-GHz clock (in average).

The selector section 343 extracts the 1-bit data from among the bits of the input 8-bit parallel data in accordance with the selector selection bit instructed (i.e., output) by the counter section 346. The selector section 343 outputs the extracted 1-bit data to the second demultiplexer section 344.

The second demultiplexer section 344 rearranges the 1-bit data output from the selector section 343 every four bits into parallel data in accordance with the 1.25-GHz clocks output from the counter section 346, and outputs the rearranged parallel data as 4-bit parallel data. At the same time, the second demultiplexer section 344 outputs the clock #2 in synchronization with the parallel data whenever the rearrangement of every four bits is completed. Since the 1-bit data has been converted into 4-bit parallel data, the 1-bit data is output as a 312.5-MHz clock which is one fourth in frequency of the 1.25-GHz clock.

In this manner, even if the low speed data rate and the high speed data rate are not in a simple integer ratio, the 4-bit parallel data ("second parallel data") and the 312.5 MHz clock #2 ("second output clock") in the low speed mode may be generated.

Hereinafter, a process in the counter section 346 will be described in more detail.

The counter section 346 consults the counter information table 3461 in accordance with the current count value of the 1.2890625-GHz clock and with the input of the change point position information BOUND_POS.

The counter section 346 determines the count value of the subsequent cycle, the selector selection bit and existence of the clock output from a combination of the current count value of the counter section 346 and the change point position information BOUND_POS in accordance with the counter information table 3461.

For example, in a case in which, if the counter information table 3461 illustrated in FIG. 5 is consulted, the current count value of the counter section 346 is 0 to 3 and the change point position information BOUND_POS is 3 or 4, the counter section 346 determines the count value of the subsequent cycle to be "current count value+2." The counter section 346 also determines the selector selection bit to be Bit[4] (bit 4). The counter sections 346 also determines that "clock output exists" and outputs the input clock (1.2890625-GHz clock) (i.e., the input clock is made to pass through).

If the current count value of the counter section 346 is in the range of 0 to 3 and the change point position information BOUND_POS is 5 or 6, the counter section 346 does not increment the count value of the subsequent cycle and keeps the current count value. The counter section 346 also determines the selector selection bit to be Bit[4] and determines that the "clock output exists." Thus, the input clock is made to pass through and output.

If the current count value of the counter section 346 is 16, the counter section 346 determines the count value of the subsequent cycle as "current count value+1" regardless of the position of the change point position information BOUND_POS. The counter section 346 also determines the selector selection bit arbitrarily. The counter section 346 determines that the "no clock output" during the current count value. Thus, the input clock is not made to pass through and the clock is not output. This means that the clock output is determined to exist whenever the current count value is not 16.

With the processes including a series of counting operations described above, the counter section 346 repeats a clock operation for the input clock (1.2890625-GHz clock) in which clocks are output when it is determined that the "clock output exists" in cycles to which the count value other than 16 is provided and clocks are not output when it is determined that the "no clock output" in cycles to which the count value of 16 is provided.

As a result, the counter section 346 generates and outputs the clock in which the input clock (1.2890625-GHz clock)× 32/33=1.25-GHz clock (in average), whereby the clock output in a proper low speed mode is achieved even if the low speed data rate and the high speed data rate are not in a simple integer ratio.

An operation of the boundary detection/low speed data extraction section 34 will be described with reference to FIGS. 6A, 6B, 7A and 7B.

FIG. 6A illustrates an exemplary operation of the boundary detection/low speed data extraction section 34 when 1.25-Gbps data in the low speed mode is input as a data latch output. FIG. 6A also illustrates 10.3125-Gbps data in the high speed mode in parallel with the operation of the boundary detection/low speed data extraction section 34 for the comparison purpose.

In FIG. 6A, a serial data wave amplitude (i.e., data change) is plotted in the vertical axis and a horizontal axis is provided as a time axis. A waveform of 33 UIs of 10.3125-Gbps data and a waveform of a 4-bit time width of the serial data S#11 to S#14 of 1.25-Gbps data are illustrated with the 1-bit time width of 10.3125-Gbps data being 1 UI.

As illustrated in FIG. 6A, the 4-bit time width of the serial data S#11 to S#14 corresponds to 4 UIs of 1.25-Gbps data with the 1-bit time width of 1.25-Gbps data being 1 UI. With this, the ratio of the data period is in a relationship that 8.25 UIs of 10.3125-Gbps data equals to 1 UI of 1.25-Gbps data, which depicts that the data rate ratio of the high speed mode and the low speed mode is not in an integer multiple ratio.

Thus, if the data latch section 31 latches, for example, the serial data S#11 to S#14 of the 1.25-Gbps data with the clock timing (illustrated by downward arrows in FIG. 6A) in the high speed mode, the latched timing may sometimes corresponds to the timing of the change positions X#1 to X#4. In such a case, the serial data S#11 to S#14 of the 1.25-Gbps data is not always correctly converted into the parallel data in the low speed mode.

FIG. 6B illustrates an operational relationship among the 8-bit parallel data processed by the edge detector section 342 and by the selector section 343, the 1.2890625-GHz clock and the count value of the counter section 346 with respect to the timing represented by the time axis on the horizontal axis.

In FIG. 6B, elongated rectangles of 8-bit parallel data P#11, P#12 and so on in the longitudinal axis direction correspond to bit widths of 8-bit data. In each of the rectangles of 8-bit parallel data, bits (Bit[0] to Bit[7]) are arranged in this order from above with Bit[0] being the least significant bit and Bit[7] the most significant bit.

Figure 8:
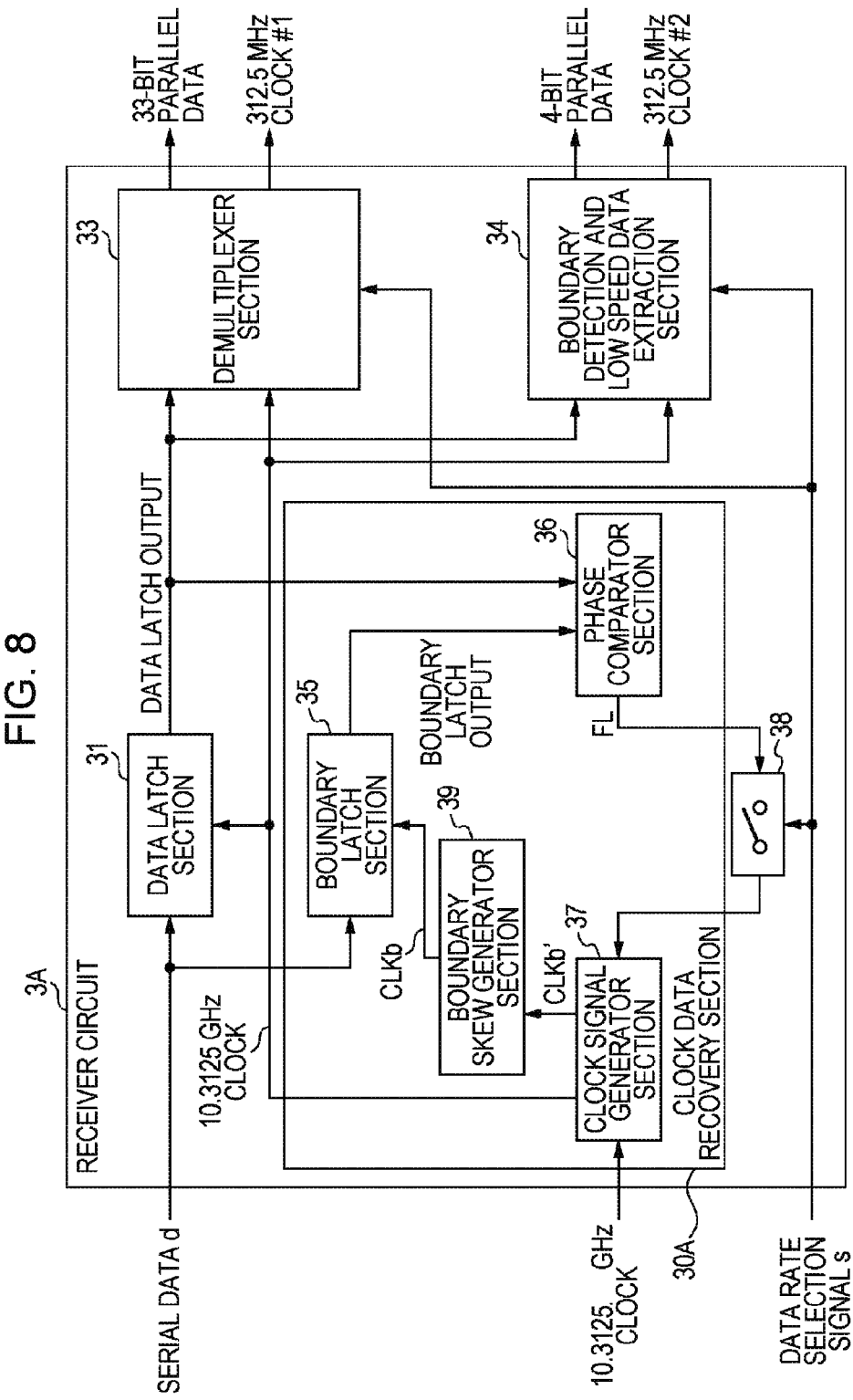
FIG. 8 illustrates another exemplary configuration of a receiver circuit according to one embodiment.

In FIG. 6B, 8-bit parallel data P#k (k is an integer), the count values and so on are processed in synchronization on the clock period (i.e., cycle) basis of the 1.2890625-GHz clock along the time axis. FIG. 6B further illustrates changing conditions of the 1.2890625-GHz clock and the count value together with the parallel data P#11, P#12 and so on.

The 1.25-Gbps data in the low speed mode is converted by the first demultiplexer section 341 into 8-bit parallel data P#k as illustrated in FIG. 6B with the timing represented by the downward arrows in FIG. 6A, i.e., in accordance with the 10.3125-GHz clock.

For example, a value A (which is 0 or 1) of the serial data S#11 illustrated in FIG. 6A is converted into 8-bit parallel data P#11 illustrated in FIG. 6B in accordance with the 10.3125-GHz clock.

When a time instant at which the serial data S#11 and a certain change point of 10.3125-Gbps data agree in FIGS. 6A and 6B is considered as a time origin (which is represented as the leftmost solid line standard), the serial data S#11 to S#14 and so on in FIG. 6A is converted into parallel data P#12 to P#14 and so on as illustrated in FIG. 6B.

Change positions X#1 to X#3 and so on in the serial data illustrated in FIG. 6A each corresponds to the bit positions which are equivalent to the locations of rectangular hatched areas representing parallel data in the 8-bit parallel data P#12 to P#14 illustrated in FIG. 6B.

For example, data of the change position X#1 between the serial data S#11 and S#12 of the 1.25-Gbps data before a parallel conversion illustrated in FIG. 6A is converted into Bit[0] which is represented by a rectangular hatched area of the 8-bit parallel data P#12 in FIG. 6B. Similarly, data of the change position X#2 between the serial data S#12 and S#13 is converted into Bit[0] which is represented by a rectangular hatched area of the 8-bit parallel data P#13.

The converted data of, for example, the change position X#1 becomes data before or after the data change at the rising edge/falling edge in accordance with the clock timing in the high speed mode.

Values A, B, C and so on are converted in areas other than the rectangular hatched areas of the 8-bit parallel data P#k as illustrated in FIG. 6B.

The edge detector section 342 detects the change positions X#1 to X#3 illustrated in FIG. 6A, i.e., the rectangular hatched areas ("boundaries") in the 8-bit parallel data illustrated in FIG. 6B, and transmits the detected data to the counter section 346 as the change point position information BOUND_POS.

The change positions in the rectangular hatched areas representing the 8-bit parallel data P#12, P#13 and so on in FIG. 6B are detected as, for example, change point position information BOUND_POS=1 in accordance with the change point position detection table 3421. Similarly, the change position in the rectangular hatched area representing the 8-bit parallel data P#14 is detected as change point position information BOUND_POS=2.

The counter section 346 consults the counter information table 3461 in accordance with the change point position information BOUND_POS and the counting operation of the 1.2890625-GHz clock and, in accordance with the result, a 1-bit bit position to be extracted from the 8-bit parallel data P#k is determined as a selector selection bit, which is notified to the selector section 343.

At the same time, the counter section 346 determines the count value of the subsequent cycle. For example, if the current count value=3 and the change point position information BOUND_POS=2 as illustrated in FIG. 6A, it is determined that the selector selection bit=Bit[4] and the count value of the subsequent cycle=current count value+1=4 in the 8-bit parallel data P#14.

The values A, B, C, D and so on which are the bit data not correspond to the change positions (i.e., the hatched areas) exist in large part in white areas of the rectangles representing the 8-bit parallel data in the bits of the 8-bit parallel data P#11 to P#14 and so on illustrated in FIG. 6B.

The selector section 343 extracts, for each 8-bit parallel data P#k, 1-bit data (illustrated by round marks in the rectangles) sufficiently separated from the rectangular hatched areas illustrated in FIG. 6B in accordance with the selector selection bit notified to the counter section 346.

For example, if the selector selection bit=Bit[4] in the 8-bit parallel data P#14 illustrated in FIG. 6B, the value D is extracted from the parallel data P#14 by the selector section 343.

As illustrated in FIG. 6B, in the repetitive counting operation with the count values of 0 to 32, it is determined that "clock output exists" in 32 cycles and "no clock output" in 1 cycle of every 33 cycles of the clock input of the 1.2890625-GHz clock. In particular, the counter section 346 skips the clock output in the cycle where the count value=16, whereby the timing of the input clock is adjusted to provide the input clock (1.2890625-GHz clock)×32/33=1.25-GHz clock (in average) and the 1.25-GHz clock is generated.

The counting operation proceeds in the example illustrated in FIG. 6B with an increment of the count values (0 to 32, 0, 1, 2 . . . ) with a change in second boundary such that the count value of the subsequent cycle becomes "current count value+ 1." However, the counting operation of the counter section 346 is not limited to the same. For example, the count value of the subsequent cycle may be set by the counter section 346 in the following manner: an increment of the current count value is set to be "current count value+0" (+0 count) to "current count value+2" (+2 count) in accordance with the change position, such as X#2 of the 8-bit parallel data P#12. With this, the timing of 1-bit data extracted from the 8-bit parallel data P#12 and so on is adjusted.

As illustrated in FIGS. 6A and 6B, a relationship of the selector selection bit to be extracted is determined from the timing of the count of an initial value (e.g. 0) of the count value and the change point position information BOUND-_POS. Thus, in initialization or re-initialization of the counting operation, the counter section 346 may detect the change point position information BOUND_POS in advance in, for example, between tens to hundreds of cycles and then start the counting operation in accordance with the detection result.

FIG. 7A illustrates another exemplary operation of the boundary detection/low speed data extraction section 34 when 1.25-Gbps data in the low speed mode is input as a data latch output. FIG. 7A also illustrates 10.3125-Gbps data in the high speed mode in parallel with the operation of the boundary detection/low speed data extraction section 34 for the comparison purpose.

The serial data S#11 to S#14 and so on illustrated in FIG. 7A is converted into parallel data P#11 to P#14, . . . , P#21 to P#24 and so on as illustrated in FIG. 7B with the certain change points of the serial data S#11 and the 10.3125 Gbps data agreeing with the illustrated timing (which are represented with the leftmost solid line standard) as illustrated in FIG. 7A.

FIG. 7B illustrates changing conditions of the 1.2890625-GHz clock and the count value together with the parallel data P#11, P#12 and so on.

A result of the counting operation with "current count value+2" (+2 count) is illustrated in the count value in C#1 illustrated in FIG. 7B and a result of the counting operation with "current count value+0" (+0 count) is illustrated in the count value in C#2.

A result of the counting operation with "current count value+1" (+1 count) is illustrated in the count value other than C#1 and C#2 illustrated in FIG. 7B.

Other features in FIGS. 7A and 7B are similar to those in FIGS. 6A and 6B. For example, data of the change position X#1 between the serial data S#11 and the serial data before S#11 of the 1.25-Gbps data before a parallel conversion illustrated in FIG. 7A is converted into Bit[1] which is represented by a rectangular hatched area of the 8-bit parallel data P#11 in FIG. 7B.

In C#1 illustrated in FIG. 7B, the change point position information BOUND_POS detected from the 8-bit parallel data P#13 is 3 and the current count value of the counter section 346 is 2. Thus, the counter section 346 sets, in accordance with the counter information table 3461, that the count value of the subsequent cycle="current count value+2," i.e., the count value=4, from this current count value and the change point position information BOUND_POS, and determines that the selector selection bit=Bit[4].

In the subsequent cycle (current count value=4), the change point position information BOUND_POS detected from the 8-bit parallel data P#14 is 3 and the current count value is 4. Thus, the counter section 346 sets, in accordance with the counter information table 3461, the count value of the subsequent cycle="current count value+1," i.e., the count value=5, from this current count value and the change point position information BOUND_POS, determines that the selector selection bit=Bit[5].

As described above, the counter section 346 increases the increment of the count value when the change position in the 8 bits parallel data P#k approaches the selector selection bit to be extracted.

In C#2 illustrated in FIG. 7B, the change point position information BOUND_POS detected from the 8-bit parallel data P#21 is 6 and the current count value of the counter section 346 is 0. Thus, the counter section 346 sets, in accordance with the counter information table 3461, the count value of the subsequent cycle="current count value+0," i.e., the count value=0, from this current count value and the change point position information BOUND_POS, determines that the selector selection bit=Bit[4].

In the subsequent count cycle, the change point position information BOUND_POS detected from the 8-bit parallel data P#22 is 7 and the current count value is 0. Thus, the counter section 346 sets, in accordance with the counter information table 3461, the count value of the subsequent cycle="current count value+1," i.e., the count value=1, from this current count value and the change point position information BOUND_POS, determines that the selector selection bit=Bit[4].

As described above, the counter section 346 delays the increment of the count value when the selector selection bit in the 8 bits parallel data P#k to be extract approaches the change position.

Regarding the degree to which the counter section 346 increments the count value, the count value may be adjusted to be "current count value+0" to "current count value+2" in accordance with the boundary detection of the 8 bits parallel data P#k.

In the repetitive counting operation with the count values of 0 to 32, 32 cycles of the 1.2890625-GHz clocks are not necessarily output during the 33 counts of the count values 0 to 32 but the 32nd cycle may be output across the count values 0 to 32 of the subsequent counting operation. That is, it suffices that the counter section 346 makes the clocks pass through (i.e., output) for the 32 cycles out of the 33 cycles of the 1.2890625-GHz clock and makes the clock of 1 cycle not pass through.

As described above, the boundary detection/low speed data extraction section 34 may generate the clocks in the low speed data rate and corresponding parallel data in accordance with the high speed data rate-based clocks while consulting the change point position detection table 3421 and the counter information table 3461 which are prepared in advance.

Since the change point position detection table 3421 and the counter information table 3461 may be provided with memory of small capacity and a small-scaled circuit, the boundary detection/low speed data extraction section 34 may be implemented with a simple circuit configuration.

Since it suffices that the counter information table 3461 corresponding to the types of the low speed data rates is prepared, a plurality of data rates may be supported without any increase in circuit size of the receiver circuit 3.

Although the 8-bit parallel data and 4-bit parallel data are exemplified as the parallel data in the present embodiment, the number of bits is not limited to the same.

[Process in High Speed Mode]

The receiver circuit 3 operates in the following manner in the high speed mode.

The switch section 38 of the receiver circuit 3 closes the switch in accordance with the data rate selection signal s in the high speed mode. This establishes an electric connection between the phase comparator section 36 and the clock signal generator section 37 in the receiver circuit 3, whereby a clock data recovery function is performed by the boundary latch section 35, the phase comparator section 36 and the clock signal generator section 37.

The data latch section 31 of the receiver circuit 3 latches data of the received serial data d in accordance with the clock timing of the 10.3125-GHz clock output from the clock signal generator section 37. The data latch section 31 outputs, as a data latch output, the latched data Dt (which will be described later with reference to FIG. 3) to the demultiplexer section 33, the boundary detection/low speed data extraction section 34 and other sections.

The demultiplexer section 33 generates and outputs 33-bit parallel data and a 312.5 MHz clock #1 in accordance with the data latch output and a clock (10.3125-GHz clock) reproduced by a CDR function.

Next, another exemplary configuration of the receiver circuit 3 according to the present embodiment will be described.

FIG. 8 illustrates another exemplary configuration of the receiver circuit 3 illustrated in FIG. 1.

The receiver circuit 3A illustrated in FIG. 8 includes a data latch section 31, a demultiplexer section 33, a boundary detection/low speed data extraction section 34, a boundary latch section 35, a phase comparator section 36, a clock signal generator section 37, a switch section 38 and a boundary clock skew generator section 39.

The boundary latch section 35, the phase comparator section 36, the clock signal generator section 37 and the boundary clock skew generator section 39 correspond to a clock data recovery section 30A, which performs a clock data recovery function. Thus, the receiver circuit 3A illustrated in FIG. 8 differs from the receiver circuit 3 illustrated in FIG. 1 in configuration of the processing section which implements the clock recovery function related to the data processing in the high speed mode.

Since the serial data d input to the receiver circuit 3A of FIG. 8, the 10.3125-GHbps clock, the data rate selection signal s and so on and outputs, such as other 33-bit parallel data, are the same as those described with reference to FIG. 2, description thereof will be omitted in the following description.

Here, the boundary latch section 35 and the boundary clock skew generator section 39 which are of significant difference from the configuration of FIG. 2 will be mainly described with reference to FIG. 8. Components dented by the same reference numerals as those in FIG. 2 have similar functions to those of the components in FIG. 2 and detailed description thereof will be omitted.

The boundary clock skew generator section 39 of the receiver circuit 3A provides predetermined clock skew (i.e., predetermined time quantity τ) to the clock for detecting boundary CLKb' output from the clock signal generator section 37 (i.e., adjusts the CLKb'). The clock for detecting boundary CLKb to which the predetermined clock skew τ is provided is output to the boundary latch section 35.

With this, the CLKb' may be adjusted with the boundary (first boundary) detection timing (HBt) in the high speed mode being effectually shifted back and forth from a position of an original (i.e., ideal) boundary detection timing (HBto) by an amount of the clock skew τ.

Figure 9:
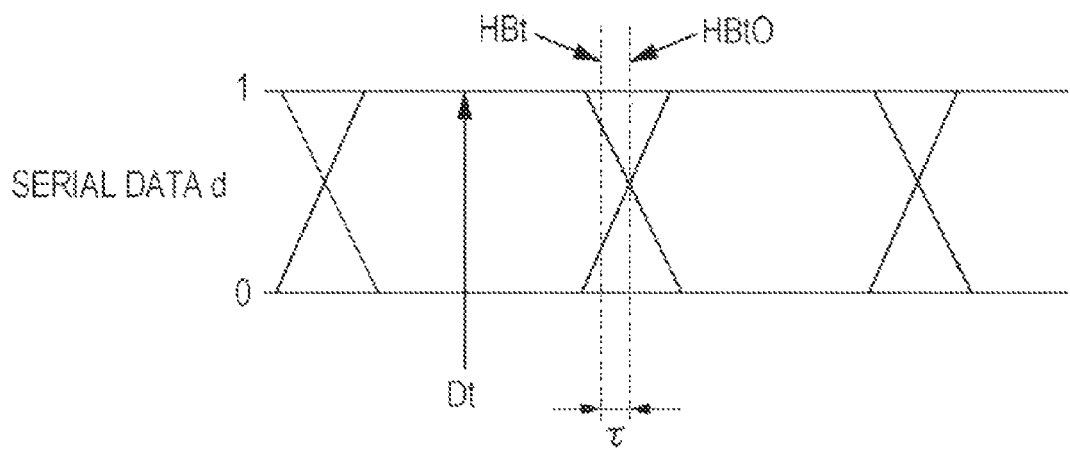
FIG. 9 illustrates an operation of a clock data recovery section according to another embodiment.
Figure 10:
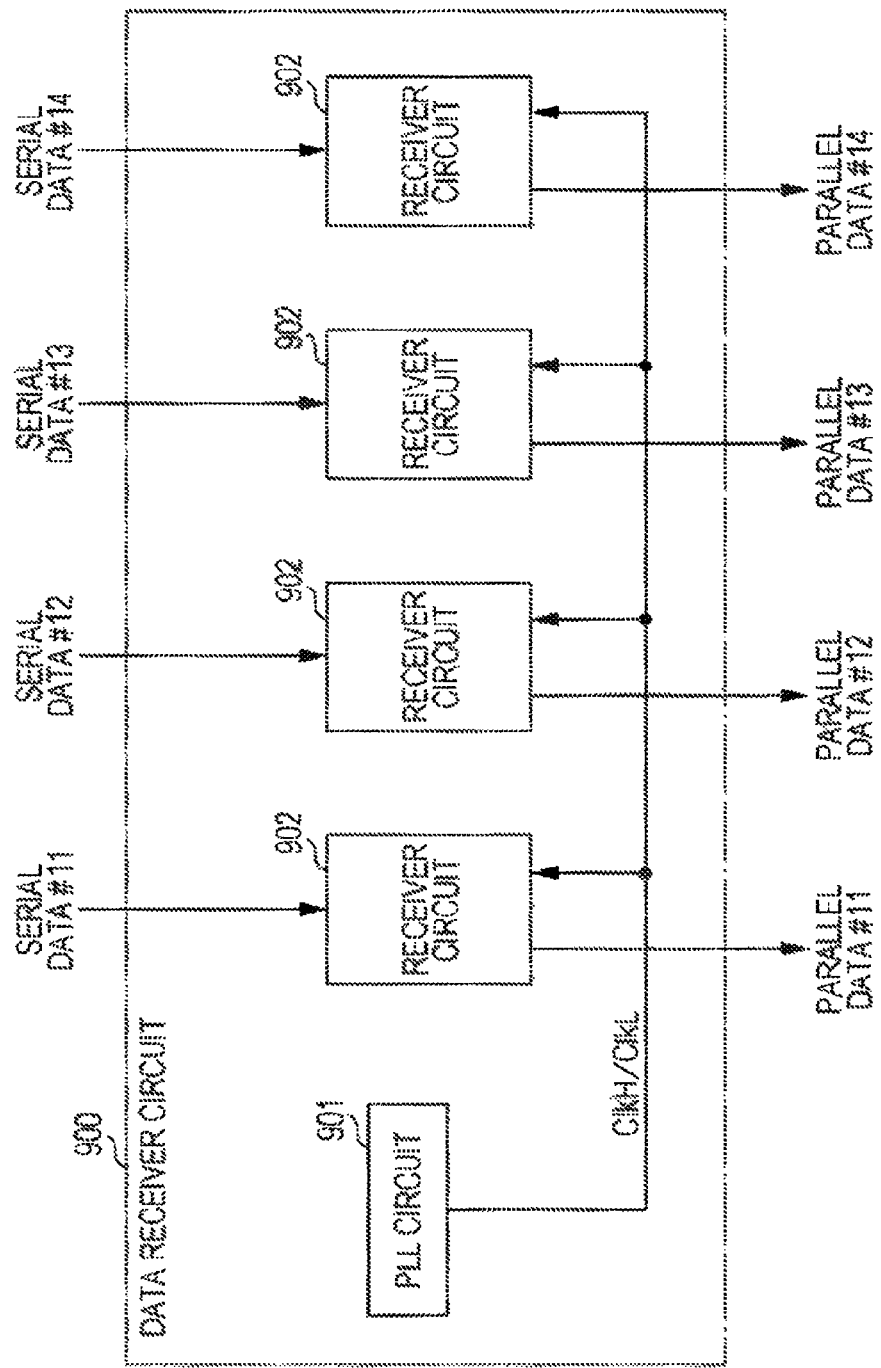
FIG. 10 illustrates a related art data transmitter and receiver circuit.
Figure 11:
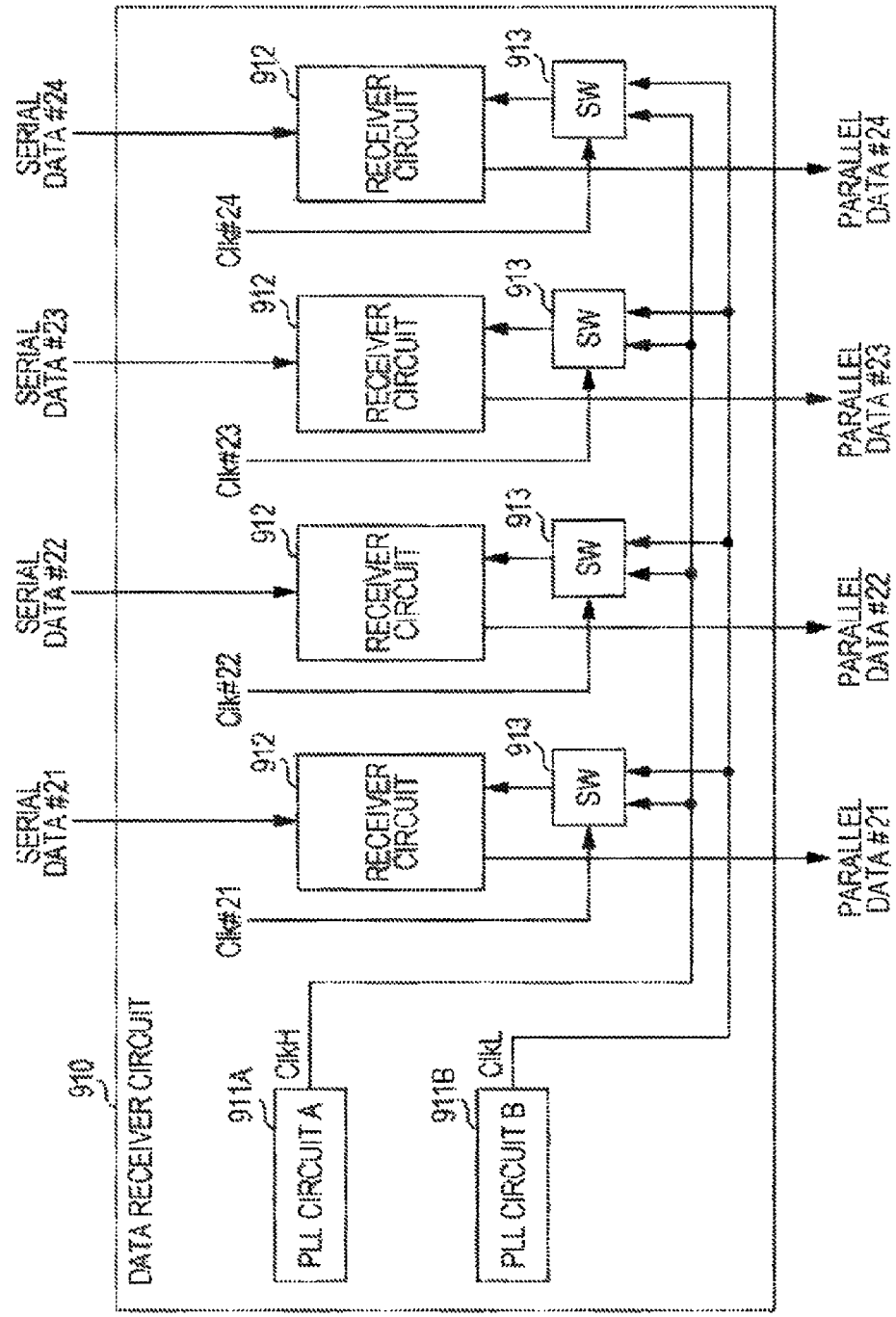
FIG. 11 illustrates a related art data transmitter and receiver circuit.

FIG. 9 illustrates the clock skew occurring during the boundary detection of data in the high speed mode in the receiver circuit 3A.

As illustrated in FIG. 9, a phase of the 10.3125-GHz clock is adjusted in accordance with boundary detection timing HBt which is incremented or delayed from the original boundary detection timing HBt0 by time quantity τ. Thus, the latch timing of the serial data d is adjusted optimally in the high speed mode and the data Dt is latched out of the serial data d in the data latch section 31.

The CDR section 30A in the high speed mode described above corresponds to a CDR circuit as described in Japanese Laid-Open Patent Publication No. 2002-314516 and also to circuitry including a circuit (i.e., a switch section 38) for switching between the high speed mode and the low speed mode.

As described above, the CDR section 30A in the receiver circuit 3A may adjust the boundary detection timing HBt in the high speed mode and avoid reduction in data transmission quality of the data receiver circuit 1 in the high speed mode.

As described above, according to the disclosed data receiver circuit which includes one or more receiver circuits 3, each of the receiver circuits 3 may receive serial data at both a high speed data rate and a lower speed data rate which is different from the high speed data rate only with a clock Clk supplied from a single PLL circuit 2.

This allows the data receiver circuit to select the transmission speed independently in each channel and, especially, to receive data at a proper low speed data rate even if the high speed data rate and the low speed data rates are not in an integer ratio.

Such a configuration with a single PLL circuit supplying the clock may be designed with minimally reduced areas occupied by the circuits, such as the PLL circuit and the switch circuit, and, at the same time, with reduced the power consumption.

Further, a single PLL circuit eliminates the need of switching among a plurality of clocks. Since unnecessary circuitry, e.g., a switch circuit, is excluded, parallel data may be generated while avoiding reduction in data transmission quality of the parallel data transmitted from the data receiver circuit.

As described above, according to the disclosed data receiver circuit, a data receiver circuit which may independently set data rates for a plurality of channels may be implemented without any increase in circuit size. Thus, a data receiver circuit that is compact in circuit configuration and reduced in power consumption is provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A data receiver circuit to convert serial data into parallel data in accordance with a data rate signal and output the parallel data, the data receiver circuit comprising:
   a clock generator to generate a reference clock based on an input clock;
   a data latch to latch the serial data and output first serial data in accordance with the reference clock;
   a first data output section to convert the first serial data into first parallel data with a first reference clock when the data rate signal indicates a first data rate is equal to a data rate of the reference clock; and
   a second data output section to convert the first serial data into second parallel data with a second reference clock when the data rate signal indicates a second data rate slower than the data rate of the reference clock,
   the second data output section includes;
      a first demultiplexer to convert the first serial data into third parallel data,
      an edge detector to detect a change point of the third parallel data, and output change point information indicating the change point;
      a counter to determine a selection bit from among each of the third parallel data in accordance with the change point information, and output selection bit information indicating the selection bit;
      a selector to extract 1-bit data from among the third parallel data in accordance with the selection bit information and outputting the extracted 1-bit data, and
      a second demultiplexer section to rearrange the output 1-bit data into the second parallel data, and output the second parallel data as 4-bit parallel data.

2. The data receiver circuit according to claim 1, wherein the second data output section includes a change point detection table, the change point detection table including the change point information used by the counter, and
the second data output section determines the selection bit in accordance with the change point information.

3. A data receiver circuit comprising:
   a clock generator to generate a reference clock based on an input clock;
   a data latch to latch the serial data and output first serial data in accordance with the reference clock;
   a first data output section to convert the first serial data into first parallel data with a first reference clock when the data rate signal indicates a first data rate is equal to a data rate of the reference clock; and
   a second data output section to convert the first serial data into second parallel data with a second reference clock when the data rate signal indicates a second data rate slower than the data rate of the reference clock;

a boundary latch to latch the first serial data in accordance with the reference clock and output second serial data;

a phase comparator to compare the first serial data and the second serial data, and output a feedback signal; and a switch to supply the feedback signal to the clock signal generator when the data rate signal indicates the first data rate, wherein the clock generator recovers the reference clock in accordance with the feedback signal.

* * * * *